US011123855B2

(12) United States Patent
Hartmann et al.

(10) Patent No.: US 11,123,855 B2
(45) Date of Patent: Sep. 21, 2021

(54) CONTROL METHOD AND BOREHOLE FLUSHING MODULE

(71) Applicant: Hilti Aktiengesellschaft, Schaan (LI)

(72) Inventors: Markus Hartmann, Mauerstetten (DE); Klaus-Peter Bohn, Schaanwald (LI); Bastian Pluemacher, Schwabmuenchen (DE); Michael Brunner, Lamerdingen (DE); Helene Wesseler, Munich (DE); Carsten Peters, Sax (CH)

(73) Assignee: Hilti Aktiengesellschaft, Schaan (LI)

( * ) Notice: Subject to any disclaimer, the term of this patent is extended or adjusted under 35 U.S.C. 154(b) by 350 days.

(21) Appl. No.: 16/341,389

(22) PCT Filed: Oct. 12, 2017

(86) PCT No.: PCT/EP2017/076022
§ 371 (c)(1),
(2) Date: Apr. 11, 2019

(87) PCT Pub. No.: WO2018/073092
PCT Pub. Date: Apr. 26, 2018

(65) Prior Publication Data
US 2020/0055173 A1    Feb. 20, 2020

(30) Foreign Application Priority Data

Oct. 20, 2016   (EP) .................................. 16194715

(51) Int. Cl.
*B23B 47/34*        (2006.01)
*B25D 17/20*        (2006.01)
(Continued)

(52) U.S. Cl.
CPC ............ *B25D 17/20* (2013.01); *B23Q 11/005* (2013.01); *B23Q 17/20* (2013.01); *B25D 16/00* (2013.01);
(Continued)

(58) Field of Classification Search
CPC .... B25D 17/20; B25D 17/22; B25D 2222/72; B25D 2250/221; B25D 2217/0057;
(Continued)

(56) References Cited

U.S. PATENT DOCUMENTS

| 5,699,261 A | * | 12/1997 | Muona | .................... E21B 44/00 700/160 |
| 6,216,800 B1 | * | 4/2001 | Wilson | .............. B23Q 11/0046 175/27 |
| 6,637,522 B2 | * | 10/2003 | Wilson | .............. B23Q 11/0046 175/212 |

(Continued)

FOREIGN PATENT DOCUMENTS

| DE | 1192132 B | 5/1965 |
| DE | 102004035875 B3 | 12/2005 |
| EP | 2067553 A1 | 6/2009 |

OTHER PUBLICATIONS

International Search Report of PCT/EP2017/076022, dated Jan. 17, 2018.

*Primary Examiner* — Andrew M Tecco
(74) *Attorney, Agent, or Firm* — Davidson, Davidson & Kappel, LLC

(57) ABSTRACT

A control method for a borehole flushing module (2) for a chiseling tool (5), includes the steps: Providing fine-grain particles in a dispenser (31); ascertaining a material (M) at a location processed by the tool (5) with the aid of a material detector (37); and introducing fine-grain particles at the location of the substrate processed by the tool (5) when the material detector (37) ascertains an iron-containing material (M2).

13 Claims, 4 Drawing Sheets

(51) Int. Cl.
*B23Q 11/00* (2006.01)
*B23Q 17/20* (2006.01)
*B25D 16/00* (2006.01)

(52) U.S. Cl.
CPC ............... *B25D 2217/0057* (2013.01); *B25D 2222/72* (2013.01); *B25D 2250/201* (2013.01); *B25D 2250/221* (2013.01); *B25D 2250/265* (2013.01)

(58) Field of Classification Search
CPC .... B25D 2217/0061; B25D 2217/0065; B25D 2217/0069; B23Q 11/005; B23Q 11/006; B23Q 17/12; B23Q 17/20; Y10T 408/45; Y10T 408/50; Y10T 408/453; Y10T 408/455
USPC .............................................. 408/58; 173/198
See application file for complete search history.

(56) References Cited

U.S. PATENT DOCUMENTS

| | | | |
|---|---|---|---|
| 6,640,205 B2* | 10/2003 | Bongers-Ambrosius | G01V 1/44 702/190 |
| 8,342,782 B2* | 1/2013 | Nishikawa | B23Q 11/006 408/67 |
| 8,529,169 B2* | 9/2013 | Nishikawa | B23Q 11/006 408/67 |
| 9,132,572 B2 | 9/2015 | Ishikawa | |
| 2009/0148246 A1* | 6/2009 | Nishikawa | B23Q 11/006 408/58 |
| 2009/0148248 A1* | 6/2009 | Nishikawa | B23Q 11/006 408/67 |
| 2014/0119845 A1* | 5/2014 | Kakimoto | B23B 45/00 408/58 |
| 2018/0085873 A1* | 3/2018 | Rompel | B28D 7/02 |

* cited by examiner

CONTROL METHOD AND BOREHOLE FLUSHING MODULE

The present invention relates to a control method for a drill/chiseling handheld power tool, which simultaneously rotates a drill and applies impacts along the drill.

BACKGROUND

U.S. Pat. No. 9,132,572 describes a hammer drill, which includes a borehole flushing module. The hammer drill has a pneumatic striking mechanism, which periodically applies impacts to a drill. The drill is also rotated around its longitudinal axis. The hammer drill is used, in particular to drill boreholes into mineral building materials, such as concrete. The drills used are therefore optimized for processing mineral building materials. The borehole flushing module removes the accumulated drill dust directly at the borehole to keep the work environment dust-free for the user. Concrete structures are typically provided with rebar, which the chiseling drill only comparatively slowly cuts through.

U.S. Pat. No. 6,640,205 describes a hammer drill, which analyzes reflected shock waves in the drill while cutting a substrate. A material composition of the substrate is ascertained based on the shock waves.

SUMMARY OF THE INVENTION

The present invention provides a control method for a borehole flushing module of a chiseling tool including the steps: Providing fine-grain particles in a dispenser; ascertaining a material at a location processed by the tool with the aid of a material detector; and introducing fine-grain particles at the location of the substrate processed by the tool when a material detector ascertains an iron-containing material. The fine-grain particles, for example mineral drill dust, favor the chisel-cutting of iron-containing materials. The fine-grain particles are preferably of the mineral type.

One embodiment provides that an air flow is aspirated from the location processed by the tool with the aid of a fan of the borehole flushing module when the material detector ascertains a primarily mineral material. If or while mineral material is being cut, the latter is removed from the borehole. The mineral borehole cuttings or drill dust hinders the progress of the cutting.

One embodiment provides that, when the material detector ascertains an iron-containing material, the fine-grain particles are introduced at the worked location by being mixed into an air flow generated by a blower of the borehole flushing module. The introduction of the particles may take place or be supported by an air flow.

One embodiment provides that a metering valve of the dispenser is closed when the material detector ascertains a mineral material, and the metering valve is opened when the material detector ascertains an iron-containing material.

One embodiment provides that the material detector detects vibrations of the borehole flushing module or vibrations of a handheld power tool in which the chiseling tool is used, with the aid of a vibration sensor, and an evaluation unit ascertains the material based on the vibrations. The vibrations of the handheld power tool increase significantly when processing rebar. The vibrations may be detected at the handheld power tool, the drill or the connected borehole flushing module. The vibrations permit a sufficiently reliable remote diagnosis of the material on which the drill head rests and strikes for processing purposes. A vibration above a threshold value may be assigned to an iron-containing material, and a vibration below the threshold value may be assigned to a primarily mineral material.

A borehole flushing module for a chiseling tool includes a blower for generating a blowing-out air flow, a controllable dispenser for outputting fine-grain particles into the air flow generated by the blower, a material detector for ascertaining the material processed by the tool and a controller. The controller is coupled with the material detector and the dispenser. In response to the material ascertained by the material detector, the controller closes the dispenser if the material detector ascertains a mineral material. The controller causes the dispenser to output the fine-grain particles if the material detector ascertains an iron-containing material.

One embodiment provides that the material detector includes a vibration sensor for detecting vibrations and an evaluation unit for assigning vibrations above a threshold value to an iron-containing material and assigning vibrations below the threshold value to a mineral material.

One embodiment provides a dust collection container and a dust filter and either a fan for generating an aspirating air flow or a blower. The blower is switchable between the blowing-out air flow and the aspirating air flow.

A handheld power tool, which includes the borehole flushing module, has an electric motor and a striking mechanism driven by the electric motor.

BRIEF DESCRIPTION OF THE FIGURES

The following description explains the present invention based on exemplary specific embodiments and figures.

Unless otherwise indicated, identical or functionally equivalent elements are indicated by identical reference numerals in the figures.

DETAILED DESCRIPTION

Figure 1:
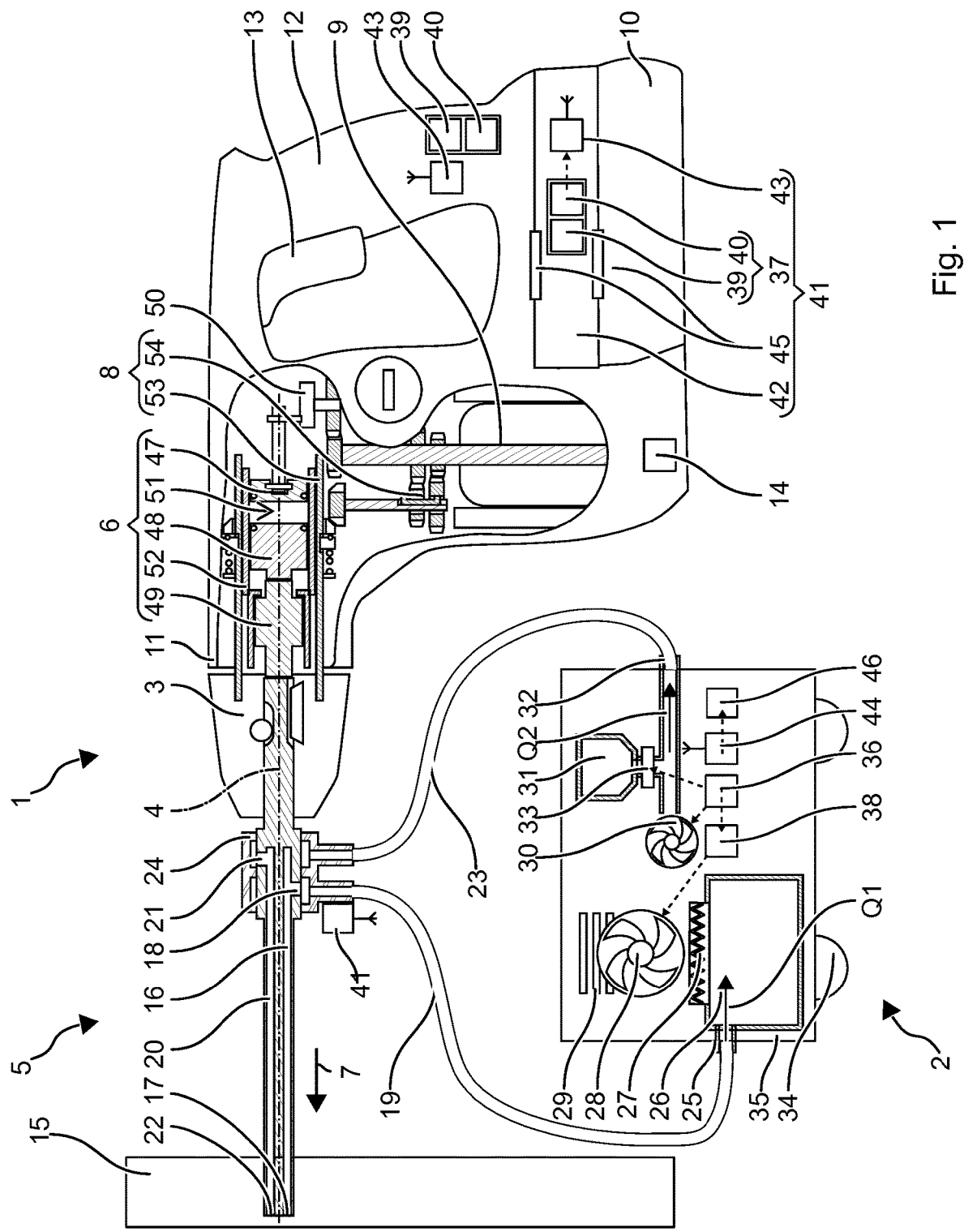
FIG. 1 shows a hammer drill, including a borehole flushing module.

FIG. 1 schematically shows a hammer drill 1, including a borehole flushing module 2 for extracting accumulated borehole cuttings. Hammer drill 1 is an example of a striking handheld power tool.

Hammer drill 1 includes a tool holder 3, into which a drill, a chisel or another striking tool 5 may be inserted and locked coaxially to a working axis 4. Hammer drill 1 includes a pneumatic striking mechanism 6, which may periodically apply impacts to drill 5 in impact direction 7. A rotary drive 8 may continuously rotate tool holder 3 around working axis 4. Pneumatic striking mechanism 6 and the rotary drive are driven by an electric motor 9, which is supplied with electrical current from a battery 10 or a power cord.

Striking mechanism 6 and rotary drive 8 are situated in a power tool housing 11. A handle 12 is typically situated on the side of power tool housing 11 facing away from tool holder 3. The user may hold and guide hammer drill 1 with the aid of handle 12 during operation. An additional handle may be fastened near tool holder 3. An operating switch 13, which the user may preferably actuate with the holding hand, is situated on or near handle 12. Electric motor 9 is switched on by actuating operating switch 13. Electric motor 9 typically rotates as long as operating switch 13 is held down. Hammer drill 1 typically includes a power regulator 14, which keeps the impact power of striking mechanism 6 constant. The regulation is based, for example, on a rotational speed regulation of electric motor 9.

Borehole flushing module 2 is initially described in interaction for a special drill 5 without being limited thereto, for the purpose of explaining the operation of borehole flushing module 2. Drill 5 includes a drill head for drilling a borehole into a substrate 15. The drill head is provided with cutting edges for a chiseling operation. Instead of a conventional spiral for removing borehole cuttings, drill 5 has an extraction channel 16 running in the shaft for extracting the borehole cuttings. Extraction channel 16 has an aspirating opening 17 on the drill head of drill 5 and an extraction opening 18 near an insertion end of drill 5. Extraction opening 18 is connected to borehole flushing module 2 via an (extraction) hose 19. Drill 5 has a feed channel 20, which is situated in the shaft of drill 5 in parallel to extraction channel 16. Feed channel 20 runs from a feed opening 21 near extraction opening 18 to an output opening 22 near the drill head or aspirating opening 17. Feed opening 21 is connected to borehole flushing module 2 via a (feed) hose 23. Extraction hose 19 and feed hose 23 may be mechanically connected to each other, but they have two separate flow channels for extraction and feeding purposes. Since drill 5 rotates around its longitudinal axis during operation, hoses 19, 23 are connected to drill 5 via a hose coupling 24. Hose coupling 24 is rotatably supported on drill 5. Hose coupling 24 has two separate annular chambers. One of the chambers in each case surrounds extraction opening 18 and feed opening 21. Instead of a mechanically cohesive hose coupling 24, extraction opening 18 and feed opening 21 may also be connected via two separate hose couplings.

Borehole flushing module 2 includes an aspiration port 25, a dust collection container 26, a dust filter 27 and a fan 28 arranged consecutively in a flow direction for the purpose of extraction. Aspiration port 25 is connected to drill 5 with the aid of flexible extraction hose 19. Fan 28 generates an air flow Q1, which flows in at aspiration opening 17 of drill 5 and extracts borehole cuttings directly in the borehole. Dust-laden air flow Q1 flows through extraction channel 16 and extraction opening 18 of drill 5 into dust collection container 26 of borehole flushing module 2. The dust is separated by dust filter 27 and remains in dust collection container 26. The cleaned air exits borehole flushing module 2 via blow-out openings 29.

Borehole flushing module 2 includes a blower 30, a dispenser 31 and a feed port 32 arranged consecutively in a flow direction for the purpose of feeding. Feed port 32 is connected to drill 5 via feed hose 23. Dispenser 31 is filled with fine-grain particles. The fine-grain particles may be, for example, borehole cuttings collected in dust collection container 26. The particles are preferably mineral particles. The average size is in the range between 10 micrometers and 200 micrometers. Alternatively or additionally, the fine-grain particles may be made from molybdenum sulfide (MoS2). Blower 30 generates an air flow Q2, which transports fine-grain particles from dispenser 31 to drill 5. The fine-grain particles are output at output opening 22 near the drill head, i.e. in the borehole. Dispenser 31 may be provided with a switchable metering valve 33 for metering the material output from dispenser 31.

Borehole flushing module 2 is, for example, a non-handheld unit, which stands on the floor during operation. The example of borehole flushing module 2 has wheels 34 on its housing 35. Aspiration port 25 and feed port 32 are accessible on the outside of housing 35 or are situated on the outside. Dust collection container 26, dust filter 27, fan 28, blower 30 and dispenser 31 are situated in housing 35. In one embodiment, fan 28 may take over the function of blower 30. Accordingly, borehole flushing module 2 has only one fan 28 instead of a fan 28 and a blower 30.

A controller 36 controls fan 28, blower 30 and dispenser 31. Controller 36 receives actuating signals of a material detector 37 and switches fan 28, blower 30 and dispenser 31 in response to these actuating signals.

Figure 2:
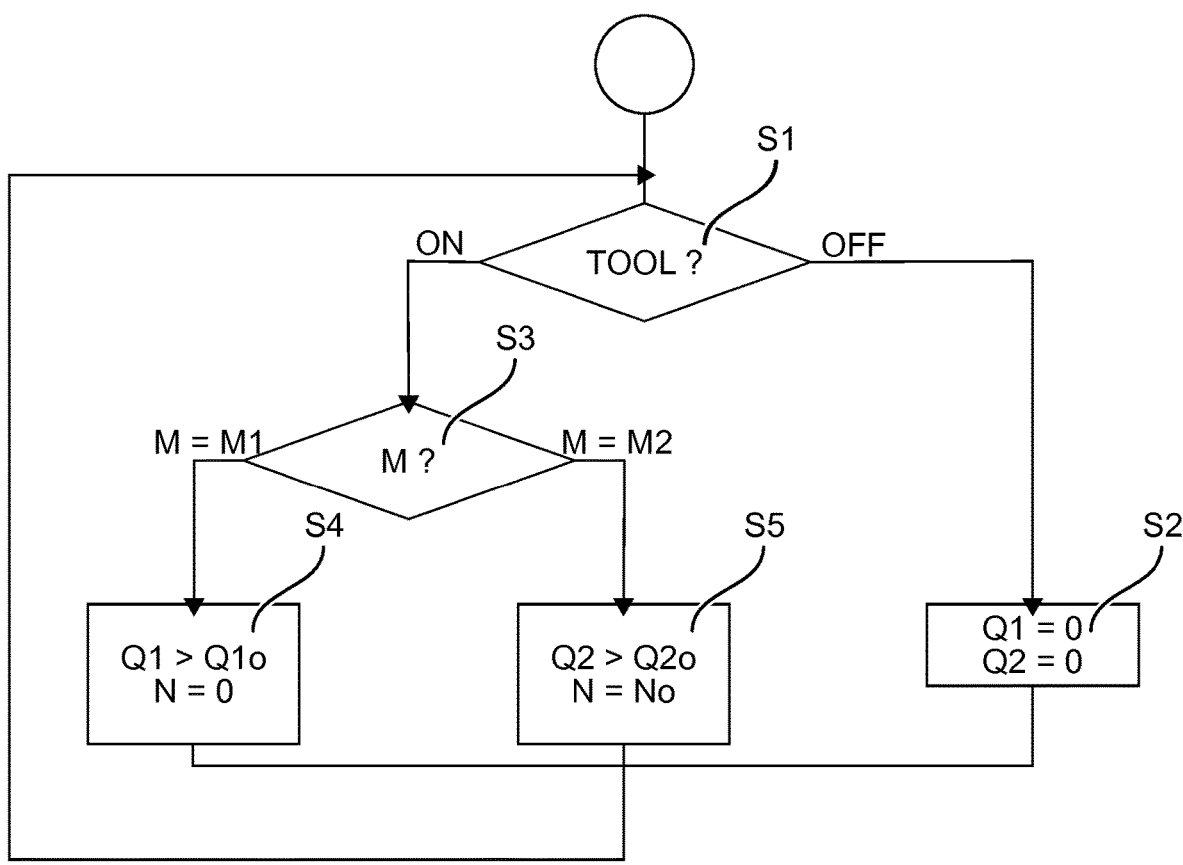
FIG. 2 shows a control method for the borehole flushing module.

An example of a control method is illustrated in FIG. 2. Material detector 37 continuously or periodically checks which material M is being processed by drill 5 in step S3. Borehole flushing module 2 carries out a (standard) operation in step S4 if the material is a mineral material M1, such as concrete, brick, natural stone. Fan 28 delivers an aspirating air flow Q1 sufficient to remove borehole cuttings. A rotational speed, regulated or unregulated, of fan 28 is equal to or greater than a nominal value. Aspirating air flow Q1 is correspondingly greater than a nominal value Q1$o$. Nominal value Q10 is, for example, in the range between 4 l/s (liters per second) and 10 l/s. Dispenser 31 is closed during the standard operation. A material quantity N of fine-grain particles output from dispenser 31 is equal to zero. Blower 30 may be switched off during the standard operation. Blowing-out air flow Q2 may be equal to zero. However, blower 30 may also blow out clean air into the borehole to support the extraction of drill dust. Blowing-out air flow Q2 is correspondingly greater than zero. Borehole flushing module 2 carries out a (flushing) operation if and as long as processed material M2 contains iron, e.g. if drill 5 is processing a rebar. Dispenser 31 now outputs the fine-grain particles. Material quantity N is greater than zero. Output material quantity No may be matched, for example, to the size of drill 5. Blower 30 is active to feed the fine-grain particles into drill 5. Blowing-out air flow Q2 is set to a nominal value Q2$o$ greater than zero. Fan 28 may be deactivated, i.e. aspirating air flow Q1 may be reduced to zero. However, it has proven to be advantageous to reduce aspirating air flow Q1 only with respect to the standard operation. The extraction in addition to the blowing out favors a rapid transport of the fine-grain particles into the borehole. The deactivation of aspirating air flow Q1 may be delayed until iron-containing material M2 is detected. The delay corresponds to a duration needed by blower 30 to transport the fine-grain particles into the borehole. Borehole flushing module 2 changes back to the standard operation when drill 5 processes mineral material.

Fan 28 may respond in an unregulated manner to the actuating signals of controller 36. The rotational speed of fan 28 and the air flow in borehole flushing module 2 are correspondingly predefined by the load limit of fan 28 or of the power supply. Alternatively, a fan controller 38 may adjust air flow Q1, the rotational speed of the fan or a pressure in borehole flushing module 2 to a setpoint variable, for example by adapting the power consumption of fan 28. A constant air flow Q1 is preferably ensured at aspiration port 25. For example, the rotational speed or the power consumption of fan 28 is increased when a greater dust quantity is determined in the aspirated air. For example, the rotational speed may also be adapted to the pressure in aspiration nozzle 17, the pressure in the surroundings of fan 28, etc. as a function of the fill level in dust collection container 26.

Material M is checked with the aid of a material detector 37. Material detector 37 may evaluate the reflected shock wave in tool 5, as described, for example, in U.S. Pat. No. 6,640,205. Another example of material detector 37 includes a vibration sensor 39 for detecting vibrations and an evaluation unit 40. Drill 5 experiences different reactive forces during the striking processing of mineral material and iron-containing material. The vibrations in hammer drill 1 are significantly higher in the case of iron-containing material than in the case of stone or other mineral materials M1. Evaluation unit 40 compares the vibrations detected by vibration sensor 39, for example with a threshold value. A drop below the threshold value is assigned to a drilling of mineral material M1 and an excess of the threshold value is assigned to a drilling of iron-containing material M2. The threshold value is ascertainable with the aid of test series. The threshold value may be stored in evaluation unit 40. Instead of the comparison with a single threshold value, the drilling of stone may be distinguished from the drilling of iron-containing material based on a more complex fingerprint. The vibrations may be ascertained in one or multiple frequency bands and compared with the particular threshold values. A frequency band has, for example, the number of impacts as the central frequency and, for example, a bandwidth of no more than half the number of impacts.

Vibration sensor 39 has, for example, a freely swinging arm, on which a piezoelectrical polymer film is applied. The arm generates an electrical signal, induced by the vibrations, which is evaluated by vibration sensor 39. Vibration sensor 39 may be an acceleration sensor, which outputs acceleration values as a measure of vibrations. Vibration sensor 39 may likewise be a microphone, preferably for detecting subsonic noise.

Material detector 37 may be situated spatially separated from borehole flushing module 2. Material detector 37 has a housing 42 separate from housing 35 as a separate detector module 41. Housing 42 is rigidly connected to drill 5 or to hammer drill 1. The vibrations of drill 5 or hammer drill 1 are transmitted to material detector 37. Material detector 37 is connected to a transmitter 43, which transmits material M ascertained by material detector 37 to borehole flushing module 2. Borehole flushing module 2 is equipped with a corresponding receiver 44 in housing 35 to receive the signals of transmitter 43.

For example, detector module 41 includes a housing 42 having two electromechanical interfaces 45. One of interfaces 45 corresponds to the interface of battery 10, and the other interface corresponds to the interface of hammer drill 1. Material detector 37 may thus be situated between hammer drill 1 and battery 10. An internal rewiring in material detector 37 connects the two interfaces 45 of material detector 37, whereby battery 10 continues to supply power to handheld power tool 1. Battery 10 also supplies power to material detector 37.

Detector module 41 may be fastened to drill 5 instead of to hammer drill 1, for example with the aid of hose coupling 24. Detector module 41 contains material detector 37, transmitter 43 and a power supply, e.g. a battery 10. Housing 42 may be detachably or permanently connected to hose coupling 24. Detector module 41 may alternatively be connected to the outer housing of hammer drill 1, e.g. with the aid of a tie-down strap. Or detector module 41 is an integral part of hammer drill 1. Evaluation unit 40 may be partially or completely situated in borehole flushing module 2.

Hammer drill 1 cuts mineral material M1 and iron-containing material M2 essentially in the same manner. The impact power of striking mechanism 6 is the same for known mineral material M1 and known iron-containing material M2. Due to the different loads of hammer drill 1 in the case of the different materials, the impact power in the case of iron-containing material M2 may possibly be slightly reduced, e.g. by up to 20% compared to the impact power in the case of mineral material M1. In one variant, the rotational speed of the rotary drive may be lower in the case of iron-containing material M2 than a rotational speed in the case of mineral material M1.

Borehole flushing module 2 is preferably switched on and off automatically, directly or indirectly by hammer drill 1. Borehole flushing module 2 is preferably inactive when hammer drill 1 is inactive (step S1, TOOL OFF). Air flow Q1 transported from borehole flushing module 2 is equal to zero, e.g. because fan 28 is off. Borehole flushing module 2 is active when hammer drill 1 is active (step S1, TOOL ON).

Borehole flushing module 2 may be connected, for example, to the power supply of hammer drill 1 or have a separate power supply. Operating switch 13 of hammer drill 1 synchronously connects the power supply for electric motor 9 and fan 28. Deactivation may also take place synchronously. In one alternative, fan 28 is switched off in step S2 after electric motor 9, with a delay of multiple seconds.

Fan 28 may be switched on and/or off indirectly by operating switch 13. For example, borehole flushing module 2 includes a sensor 46 for detecting a power consumption of hammer drill 1. Hammer drill 1 may transmit a corresponding signal to receiver 44 via transmitter 43. In addition, borehole flushing module 2 may have a power outlet for supplying a mains-operated hammer drill 1. Sensor 46 may detect whether hammer drill 1 is receiving electrical power at the power outlet. An indirect activation is advantageous, in particular for borehole flushing modules 2 having an independent power supply. Borehole flushing module 2 may be placed manually by the user into a waiting state, from which it is woken up by operating switch 13.

Vibration sensor 39 may be used to switch on borehole flushing module 2. Evaluation unit 40 compares the vibrations with a lower limit. The lower limit is selected to be so low as to correlate with a switched-off hammer drill 1. If the vibrations are below the lower limit, evaluation unit 40 deactivates borehole flushing module 2, e.g. according to step S2. If the detected vibrations exceed the lower limit, evaluation unit 40 interprets this as a switched-on hammer drill 1 (step S1, TOOL ON). The threshold value for distinguishing between a processing of mineral material M1 and iron-containing material M2 is significantly higher than the lower limit. The threshold may be ascertained in test series for different power classes of hammer drill 1. In one refinement, the threshold value may be ascertained for different tools. For example, hammer drill 1 may detect an inserted tool 3 with the aid of a sensor and set the threshold value according to tool 3. One refinement takes into account the different sound when chiseling concrete and steel. One variant takes into account only a portion of the vibrations within a frequency range for the comparison with the threshold value. For example, this may be within a frequency range between 200 Hz and 2 kHz, which may be assigned to the higher sound of an impact of metal on metal. Another variant compares a low-frequency portion with a high-frequency portion. Evaluation unit 40 compares the average amplitude of the low-frequency portion with the average amplitude of the high-frequency portion. A relative increase in the high-frequency portion compared to the low-frequency portion points to the processing of iron-containing material. Evaluation unit 40 compares the relative portion with a suitable threshold value. Evaluation unit 40 may ascertain the signal strength in the frequency ranges, for example with the aid of a Fourier analysis or determine it with the aid of analog filters.

Pneumatic striking mechanism 6 includes an exciter 47, a striker 48 and an anvil 49 along impact direction 7. Exciter 47 is forced with the aid of electric motor 9 to move periodically along working axis 4. Exciter 47 is connected via a gearing component 50 to convert the rotational movement of electric motor 9 into a periodic, translational movement along working axis 4. An example of a gearing component is an eccentric wheel or a wobble plate. A period of the translational movement of exciter 47 is predefined by the rotational speed of electric motor 9 and possibly a step-down ratio of the gearing component.

Striker 48 couples to the movement of exciter 47 via an air spring. The air spring is formed by a pneumatic chamber 51, which is closed between exciter 47 and striker 48. Striker 48 moves in impact direction 7 until striker 48 strikes anvil 49. Anvil 49 abuts drill 5 in impact direction 7 and transmits the impact to drill 5. The period of the movement of the striker is identical to the period of the movement of exciter 47. Striker 48 thus strikes with a number of impacts equal to the inverse of the period. The operating principle of the air spring sets narrow limits for the period and the number of impacts, since the efficiency of the pneumatic hose coupling is dependent on an essentially resonant excitation. If there is a deviation of more than 20% from an optimum number of impacts, striker 48 typically no longer follows the movement of exciter 47. The optimum number of impacts is predefined by the mass of striker 48 and the geometric dimensions of pneumatic chamber 51. An optimum number of impacts is in the range between 25 Hz and 100 Hz.

The example of striking mechanism 6 includes a piston-shaped exciter 47 and a piston-shaped striker 48, which are guided by a guiding tube 52 along working axis 4. Exciter 47 and striker 48 abut the inner surface of guiding tube 52 with their lateral surfaces. Pneumatic chamber 51 is closed by exciter 47 and striker 48 along working axis 4 and by guiding tube 52 in the radial direction. Sealing rings in the lateral surfaces of exciter 47 and striker 48 may improve the air-tight closure of pneumatic chamber 51. Exciter 47 is driven by electric motor 9. Eccentric wheel 50 or another converter converts the rotational movement of electric motor 9 into the periodic translational movement of exciter 47. Eccentric wheel 50 is connected to electric motor 9.

Rotary drive 8 includes spindle 53, which is situated coaxially to working axis 4. Spindle 53 is, for example, hollow, and striking mechanism 6 is situated within the spindle. Tool holder 3 is mounted on spindle 53. Tool holder 3 may be detachably or permanently connected to spindle 53 via a closing mechanism. Spindle 53 is connected to electric motor 9 via a step-down gearing 54. The rotational speed of spindle 53 is lower than the rotational speed of electric motor 9. A friction clutch may be connected between step-down gearing 54 and spindle 53.

Figure 3:
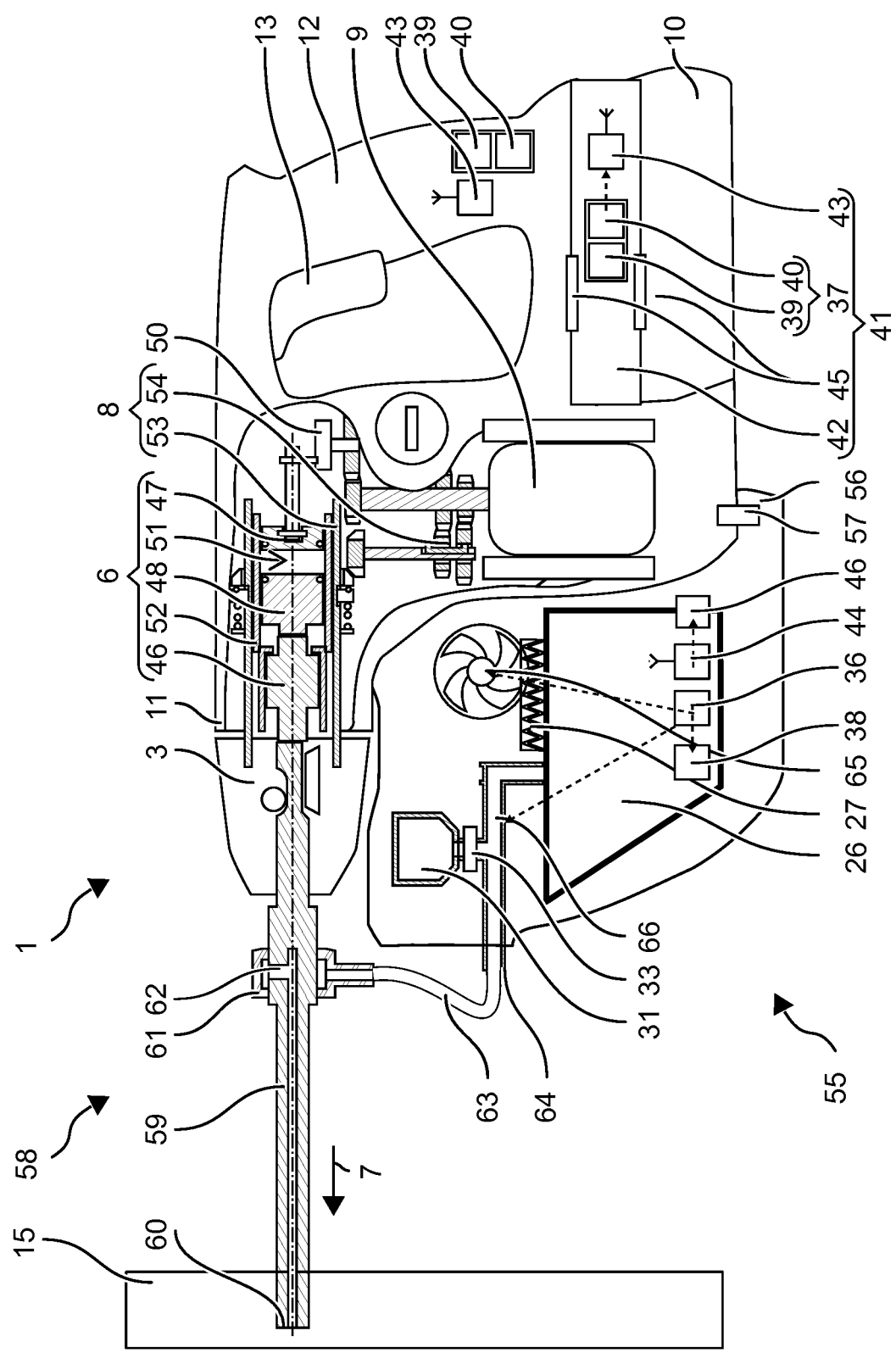
FIG. 3 shows a hammer drill, including a borehole flushing module.

FIG. 3 shows a handheld borehole flushing module 55. Borehole flushing module 55 includes a housing 56, which may be fastened to power tool housing 11. For example, housing 56 includes a locking mechanism 57, with the aid of which borehole flushing module 55 is detachably connected to hammer drill 1. The user may hold and guide borehole flushing module 55, together with hammer drill 1, during operation with the aid of handle 12 of hammer drill 1.

Borehole flushing module 55 is explained in connection with an example of a drill 58. In contrast to preceding drill 5, drill 58 has only one internal channel 59. Internal channel 59 is used to extract borehole cuttings as well as to feed the fine-grain particles. Channel 59 has a head-side opening 60. A hose coupling 61 surrounds a power tool-side opening 62 of channel 59. Hose coupling 61 is connected to borehole flushing module 55 via a hose 63 or a rigid channel.

Borehole flushing module 55 includes a port 64, dust collection container 26, dust filter 27 and blower 65 in the inflow direction. Blower 65 may aspirate an air flow Q1, which extracts dust-laden air from drill 58 and thus out of the borehole. The dust is separated at dust filter 27. The operation is similar to that of borehole flushing module 2.

Borehole flushing module 55 also includes dispenser 31. Dispenser 31 is preferably situated in a channel 66 between port 64 and dust collection container 26. Dispenser 31 may output fine-grain particles into channel 66. Metering valve 33 is opened and closed accordingly. The particles may be blown out of borehole flushing module 2 by blower 65 via port 64; blowing-out air flow Q2 runs in the opposite direction from aspirating air flow Q1. The example of blower 65 has a reversible conveying direction. In alternative embodiments, a separate fan may be provided for aspirating and a blower for blowing out.

An example of a control method for borehole flushing module 55 is based on a continuous checking of which material M is being processed by drill 58. Borehole flushing module 55 continues to aspirate air as long as material detector 37 ascertains a mineral material M1. Air flow Q1 is greater than zero. Dispenser 31 and metering valve 33 are closed. Once material detector 37 has detected a processing of iron-containing material M2, borehole flushing module 55 changes from aspirating operation to blowing-out operation. Air flow Q1 is equal to zero; air flow Q2 is greater than zero. Blower 65 is switched over correspondingly, for example the supplying current reverses polarity. Dispenser 31 is opened, whereby fine-grain particles fall into channel 66 and are blown out by air flow Q2 and transported into the borehole. When material detector 37 again detects mineral material M1, dispenser 31 is closed, and blowing-out air flow Q2 is replaced by aspirating air flow Q1.

Borehole flushing module 55 may also be used in combination with a classic drill having a transport spiral. Borehole flushing module 55 receives the borehole cuttings from the transport spiral. Hose coupling 61 preferably rests against substrate 15 to extract the borehole cuttings preferably close to the drill head. Hose coupling 61 may be movably guided along working axis 4, for example with respect to housing 56.

Similarly to the method described above, material detector 37 detects whether the drill is processing a mineral material M1 or an iron-containing material M2. The drill is rotationally driven as long as mineral material M1 is detected. The rotational direction is typically clockwise, so that the borehole cuttings are transported from the drill head in the direction of the insertion end. Blower 65 extracts the borehole cuttings from the transport spiral. If an iron-containing material M2 is detected, the rotational direction of the drill is inverted. The rotational direction is now typically counter-clockwise, so that the borehole cuttings are transported to the drill head. Dispenser 31 is opened. Blower 65 blows an air flow Q2 out of borehole flushing module 55, which carries along the fine-grain particles. The transport spiral transports the particles in the borehole to the drill head. Once material detector 37 has again detected mineral material M1, borehole flushing module 55 changes to the aspirating mode.

Figure 4:
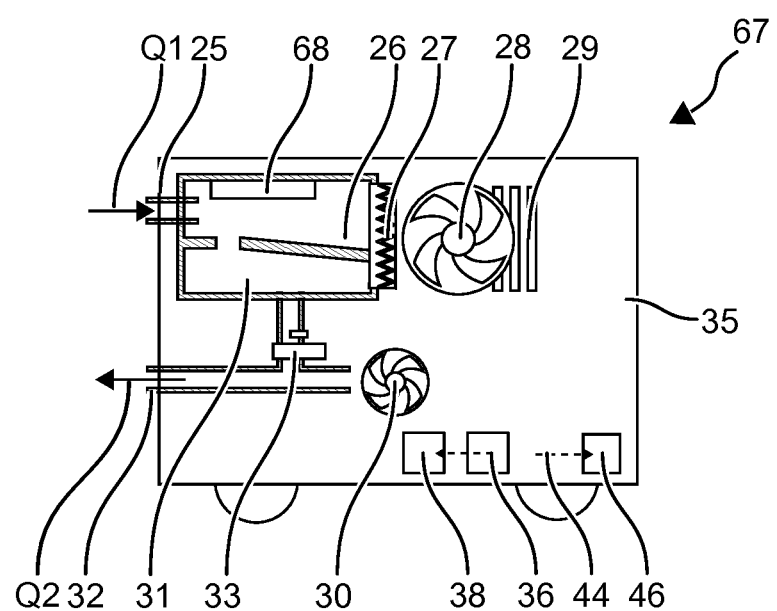
FIG. 4 shows a borehole flushing module.

FIG. 4 shows an embodiment of borehole flushing module 67. Borehole flushing module 67 includes a dust collection container 26, a dust filter 27 and a fan 28, like the borehole flushing modules described above. Borehole flushing module 67 may generate an air flow Q1 for extracting borehole cuttings out of the borehole.

Borehole flushing module 67 may also generate an air flow Q2 for blowing fine-grain particles into the borehole. Borehole flushing module 67 uses the borehole cuttings previously aspirated into dust collection container 26 as mineral, fine-grain particles. Dust collection container 26 is thus used in the same way as dispenser 31. Iron-containing particles are preferably removed from aspirated air flow Q1. The removal may take place with the aid of a magnet 68. Magnet 68 is situated, for example, near aspiration port 25. The iron filings may adhere directly to magnet 68. Alternatively, dust collection container 26 may have an area separate from dispenser 31 for collecting iron-containing material from the contaminated area. Magnet 68 may deflect iron-containing material M2. In addition, the heavier metal may be separated by a centrifuge and a curved air guide.

The illustrated specific embodiment uses a fan 28 and a blower 30 for the two air flows Q1, Q2. In one embodiment, a blower may generate both air flows Q1, Q2. In addition, borehole flushing module 67 may be designed according to the handheld manner.

What is claimed is:

1. A control method for a borehole flushing module for a chiseling tool, the control method comprising the steps of:
    providing fine-grain particles in a dispenser;
    ascertaining a material at a location processed by the tool with the aid of a material detector; and
    introducing the fine-grain particles at the location processed by the tool when the material detector ascertains an iron-containing material.

2. The control method as recited in claim 1 wherein an aspiration of an air flow from the location processed by the tool with the aid of a fan of the borehole flushing module when the material detector ascertains a primarily mineral material.

3. The control method as recited in claim 1 wherein, when the material detector ascertains an iron-containing material, the fine-grain particles are introduced into the processed location by being mixed into an air flow generated by a blower of the borehole flushing module.

4. The control method as recited in claim 1 wherein the fine-grain particles are separated out of the air flow and supplied to the dispenser.

5. The control method as recited in claim 4 wherein the iron-containing particles are removed from the air flow.

6. The control method as recited in claim 1 wherein a metering valve of the dispenser is closed when the material detector ascertains a mineral material, and the metering valve is opened when the material detector ascertains an iron-containing material.

7. The control method as recited in claim 1 wherein the material detector detects vibrations of the borehole flushing module or vibrations of a handheld power tool into which the chiseling tool is inserted, with the aid of a vibration sensor, and an evaluation unit ascertains the material based on the vibrations.

8. The control method as recited in claim 7 wherein a vibration above a threshold value is assigned to an iron-containing material, and a vibration below the threshold value is assigned to a primarily mineral material.

9. A borehole flushing module for a chiseling tool, the borehole flushing module comprising:
    a blower for generating a blowing-out air flow;
    a controllable dispenser for outputting fine-grain particles into the air flow generated by the blower;
    a material detector for ascertaining the material processed by the tool;
    a controller closing the dispenser in response to the material ascertained by the material detector when the material detector ascertains a mineral material and causing the dispenser to output the fine-grain particles when the material detector ascertains an iron-containing material.

10. The borehole flushing module as recited in claim 9 wherein the material detector includes a vibration sensor for detecting vibrations and an evaluation unit for assigning vibrations above a threshold value to an iron-containing material and assigning vibrations below the threshold value to a mineral material.

11. The borehole flushing module as recited in claim 9 further comprising a dust collection container and a dust filter and a fan for generating an aspirating air flow.

12. The borehole flushing module as recited in claim 9 further comprising a dust collection container and a dust filter, wherein the blower the blower is switchable between the blowing-out air flow and an aspirating air flow.

13. A handheld power tool comprising the borehole flushing module as recited in claim 9 and an electric motor and a striking mechanism driven by the electric motor.

* * * * *